US012097515B2

(12) United States Patent
Lee et al.

(10) Patent No.: US 12,097,515 B2
(45) Date of Patent: Sep. 24, 2024

(54) CONTAINER FOR SPRAYING LIQUID

(71) Applicant: SAMHWA CO., LTD, Uiwang-si (KR)

(72) Inventors: Kyungchang Lee, Uiwang-si (KR); Byung-Jin Woo, Gunpo-si (KR); Geun Jang, Suwon-si (KR); Ki Sung Lee, Yongin-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 674 days.

(21) Appl. No.: 17/369,898

(22) Filed: Jul. 7, 2021

(65) Prior Publication Data

US 2022/0072573 A1 Mar. 10, 2022

(30) Foreign Application Priority Data

Sep. 10, 2020 (KR) ........................ 10-2020-0116080

(51) Int. Cl.
*B05B 11/10* (2023.01)

(52) U.S. Cl.
CPC ...... *B05B 11/1047* (2023.01); *B05B 11/1052* (2023.01); *B05B 11/1066* (2023.01)

(58) Field of Classification Search
CPC ............. B05B 11/1047; B05B 11/1066; B05B 11/1052
See application file for complete search history.

(56) References Cited

U.S. PATENT DOCUMENTS 4,793,527 A * 12/1988 Di Stefano .......... B65D 83/386 222/518
5,738,250 A * 4/1998 Gillingham ......... B05B 11/0044 222/321.9
6,237,814 B1 * 5/2001 Blyler ............... B05B 11/00444 222/189.09
6,357,629 B1 * 3/2002 Ding ..................... B05B 11/106 222/321.9
7,934,626 B2 * 5/2011 Choi ................... B05B 11/0072 222/320
8,672,190 B1 * 3/2014 Wang .................... B05B 11/106 222/321.9

(Continued)

FOREIGN PATENT DOCUMENTS

KR 20-0416530 Y1 5/2006
KR 10-1067748 B1 9/2011

(Continued)

*Primary Examiner* — Vishal Pancholi
*Assistant Examiner* — Randall A Gruby
(74) *Attorney, Agent, or Firm* — Park, Kim & Suh, LLC

(57) ABSTRACT

A container for spraying liquid is disclosed, which includes: a tube having a filling space; a body in which the tube is inserted, where the outer perimeter of the tube and the inner perimeter of the body form a body outlet passage, a lower tube hole is formed at a bottom of the tube as an entrance to the body outlet passage, and an upper movement hole is formed at a top of the body as an exit from the body outlet passage; a body cover coupled to the top of the body, where the body cover includes a cover channel connecting with the upper movement hole and a pump insertion space connecting with the cover channel and receiving a pump inserted therein; and a pump support coupled to the top of the body cover and supporting the pump to block outside air from entering the pump insertion space.

8 Claims, 15 Drawing Sheets

(56) References Cited

U.S. PATENT DOCUMENTS

| | | | | |
|---|---|---|---|---|
| 9,016,527 | B2 * | 4/2015 | Faneca Llesera | F04B 19/22<br>222/321.2 |
| 9,248,462 | B2 * | 2/2016 | Csaszar | B05B 11/1047 |
| 10,092,921 | B2 * | 10/2018 | Muller | A45D 34/00 |
| 10,112,206 | B2 * | 10/2018 | Espinoza | F04B 19/22 |
| 10,259,003 | B2 * | 4/2019 | Dhir | B05B 11/1008 |
| 2004/0000567 | A1 * | 1/2004 | Greiner-Perth | B05B 11/1092<br>222/321.9 |
| 2007/0215642 | A1 * | 9/2007 | van der Heijden | B05B 7/0037<br>222/190 |
| 2009/0255957 | A1 * | 10/2009 | Mizushima | B05B 11/1059<br>222/321.9 |
| 2013/0043283 | A1 * | 2/2013 | Lin | B05B 11/1087<br>222/401 |
| 2015/0060484 | A1 * | 3/2015 | Byun | B05B 1/002<br>222/321.9 |
| 2021/0178414 | A1 * | 6/2021 | Lee | B05B 11/0064 |
| 2021/0187530 | A1 * | 6/2021 | Lee | B05B 1/3447 |
| 2021/0310469 | A1 * | 10/2021 | Huang | F04B 53/162 |
| 2023/0092170 | A1 * | 3/2023 | Arminak | F04B 53/06<br>417/454 |
| 2023/0112709 | A1 * | 4/2023 | Lee | B05B 11/1098<br>222/400.8 |
| 2023/0330690 | A1 * | 10/2023 | Lee | B65D 1/02 |
| 2023/0330691 | A1 * | 10/2023 | Lee | B05B 11/1047 |

FOREIGN PATENT DOCUMENTS

| | | | |
|---|---|---|---|
| KR | 10-2015-0103858 | A | 9/2015 |
| KR | 10-1963619 | B1 | 3/2019 |

* cited by examiner

CONTAINER FOR SPRAYING LIQUID

CROSS-REFERENCE TO RELATED APPLICATIONS

This application claims the benefit of Korean Patent Application No. 10-2020-0116080 filed on Sep. 10, 2020, the disclosure of which is incorporated herein by reference in its entirety.

BACKGROUND

1. Technical Field

The present invention relates to a container for spraying liquid that has an improvement in the passage structure for discharging the content.

2. Description of the Related Art

In a cosmetic container and the like, a pump is coupled to the opening at the upper part of a container holding a liquid content such as a perfume, etc., to dispense and spray the content to the exterior in designated amounts. When the user presses down on a nozzle corresponding to a button so as to spray the liquid content, the content that had entered the inside of the pump is pressurized, moved upward along the discharge passage, and sprayed through the nozzle. When the pressure on the nozzle is released, the discharge passage is mechanically closed by the rising of the nozzle, the pressure inside the pump is decreased, and the content is drawn in from the container to compensate.

A pump such as the above is being used not only for spraying perfumes and cosmetics but also a variety of other contents such as air fresheners, insecticides, etc. Due to the convenience of dispensing designated amounts of a content with a single pressing of the nozzle without having the content exposed to the exterior, the demand for the pump continues to grow. A conventional pump and a typical structure for a container having a coupled pump are disclosed in documents such as Korean Registered Patent No. 1963619.

In order to dispense the content from the body in which the content is stored, the pump is connected to a long hose, with the lower end of the hose reaching the bottom of the body. The suctioning force of the pump is transferred to the hose, whereby the content stored in the body is drawn in through the hose to the pump. Although such a hose makes it possible to completely use up the content stored in the body, the hose may also lower the aesthetic of the body, as the hose is inserted into the body and visible from the exterior. The problem of lowered aesthetic is particularly conspicuous when the body corresponds to a cosmetic container. As such, containers that use pumps are often fabricated with the body made from an opaque material, in order that the hose may not be seen from the exterior.

SUMMARY OF THE INVENTION

An aspect of the present invention, which was derived to resolve the problem described above, is to provide a container for spraying liquid in which the hose can be omitted due to an improvement in the passage structure for discharging the content.

Other objectives of the present invention will be more clearly understood from the embodiments set forth below.

One aspect of the present invention provides a container for spraying liquid that includes: a tube in which a filling space is formed; a body in which the tube is inserted, where the outer perimeter of the tube and the inner perimeter of the body form a body outlet passage, a lower tube hole is formed in a lower part of the tube as an entrance to the body outlet passage, and an upper movement hole is formed in an upper part of the body as an exit from the body outlet passage; a body cover coupled to the upper part of the body, where the body cover includes a cover channel and a pump insertion space, the cover channel connects with the upper movement hole, and the pump insertion space connects with the cover channel and has a pump inserted therein; and a pump support coupled to an upper part of the body cover and supporting the pump in a manner that blocks the entry of outside air into the pump insertion space.

A container according to an embodiment of the present invention can include one or more of the following features. For example, the container can additionally include a shoulder coupled to an upper part of the pump support and pressing down on the pump.

A separation protrusion can be formed on a bottom surface of the pump insertion space such that a gap is formed between the pump and the bottom surface.

A center hole in which the pump insertion space may be inserted can be formed in the upper part of the body, an outlet protrusion can be formed on one side of the center hole, and the upper movement hole can be formed on the inside of the outlet protrusion.

The body cover can include a passage protrusion, which may be inserted in the inside of the outlet protrusion and may connect with cover channel.

The pump support can include a contact protrusion that tightly contacts the periphery of the pump.

The body can have a horizontal cross section shaped as any one of a triangle, a quadrilateral, a circle, and an ellipse.

The shoulder can include a detent protrusion that presses down on the pump, a shoulder air hole can be formed in the detent protrusion, a support air groove that connects with the shoulder air hole can be formed in the pump support, an air nozzle that connects with the support air groove can be formed on the body, and the air nozzle can connect with the filling space.

The body cover can include an air inlet protrusion in which the air nozzle may be inserted.

A base can be coupled to a lower part of the body. Also, a pump for dispensing the content can be additionally included.

An embodiment of the present invention having the features above can provide various advantageous effects including the following. However, an embodiment of the present invention may not necessarily exhibit all of the effects below.

An embodiment of the present invention can provide a container in which the hose for discharging the content can be omitted.

DETAILED DESCRIPTION OF THE INVENTION

Figure 1:
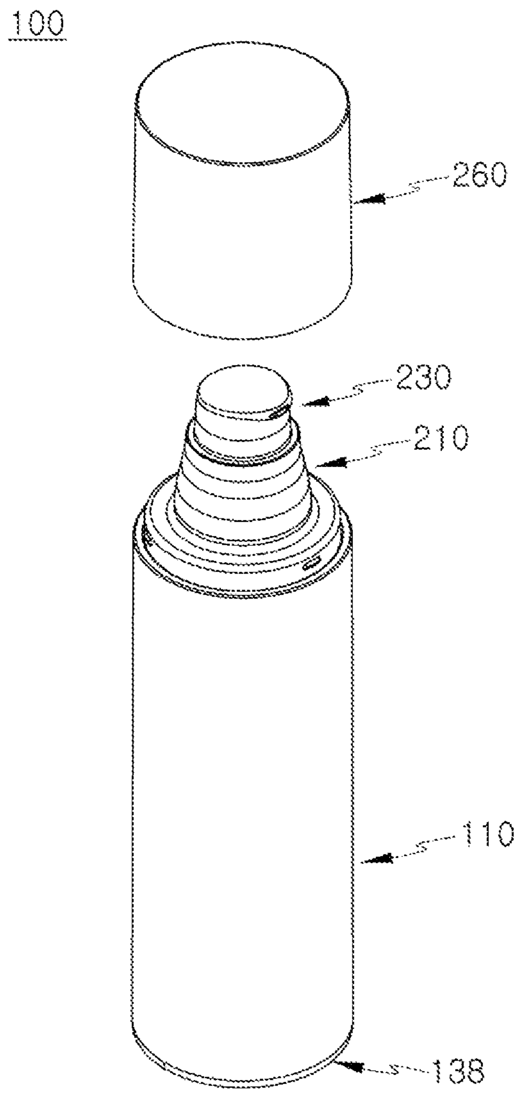
FIG. 1 is a perspective view of a container for spraying liquid according to a first disclosed embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

A container for spraying liquid according to this embodiment can be used for spraying various types of liquid such as cosmetics, perfumes, shampoos, detergents, disinfectants, chemicals, etc., and is not limited by the type or property of the content being sprayed.

Figure 2:
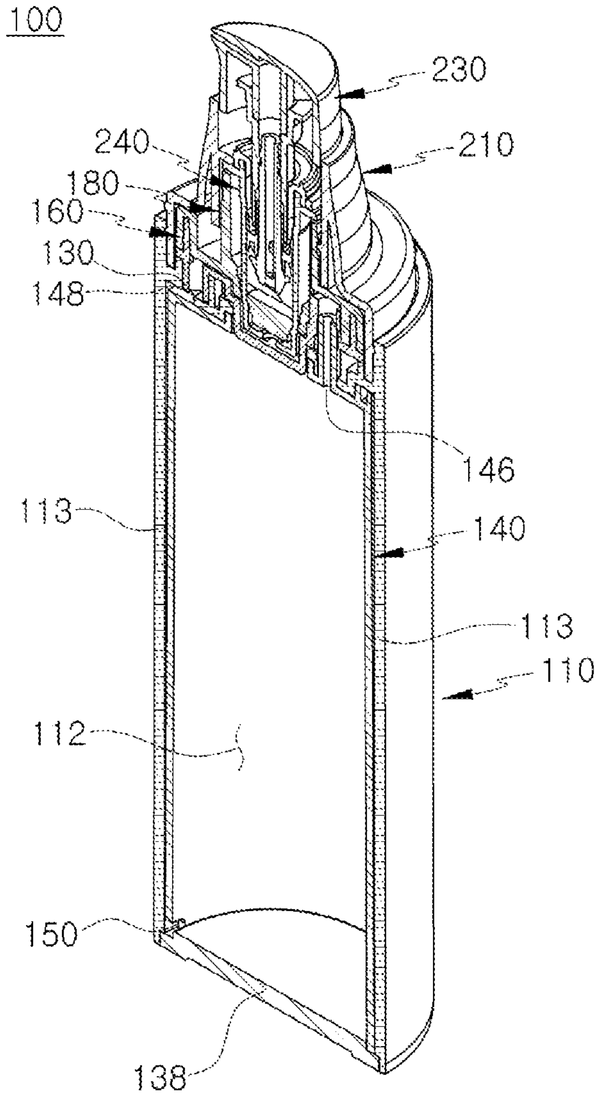
FIG. 2 is a cross-sectional perspective view of the container illustrated in FIG. 1.
Figure 3:
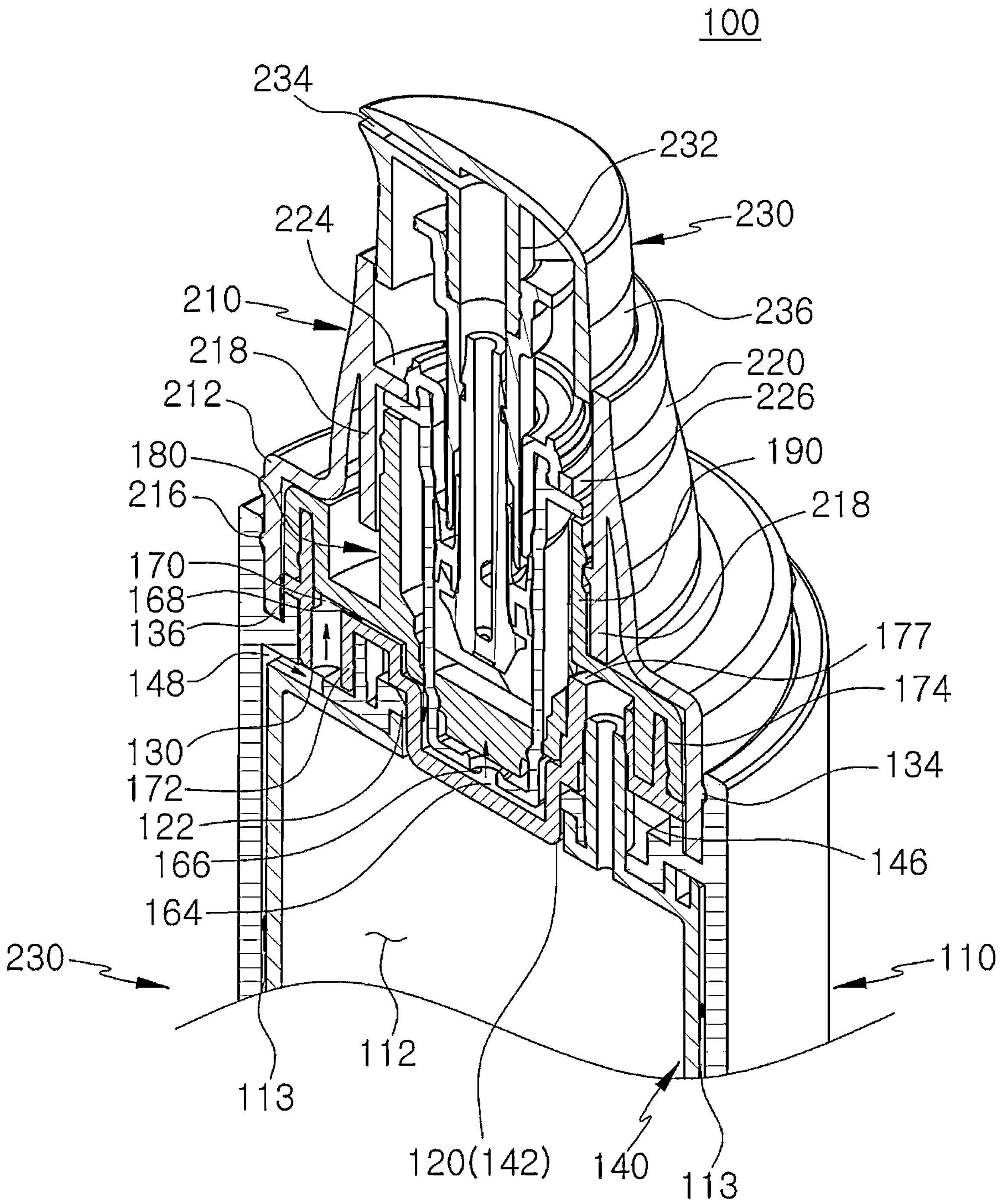
FIG. 3 is a cross-sectional perspective view showing an upper part of the container illustrated in FIG. 2.

FIG. 1 is a perspective view of a container 100 for spraying liquid according to a first disclosed embodiment of the present invention. FIG. 2 is a cross-sectional perspective view of the container 100 illustrated in FIG. 1, and FIG. 3 is a cross-sectional perspective view showing an upper part of the container 100 illustrated in FIG. 2. Incidentally, the arrows in FIG. 3 illustrate the flow of the content as it is discharged.

Referring to FIGS. 1 to 3, a container 100 based on this embodiment has the hose omitted from the filling space 112 of the tube 140 storing the content (not shown) and has the passage for discharging the content formed as a circular body outlet passage 113 by having the tube 140 inserted within a body 110. In this way, the container 100 based on this embodiment can be made to have a simple structure as well as an improved aesthetic, since there is no hose visible even when the body 110 and the tube 140 are made from transparent materials.

A container 100 based on this embodiment includes a body 110, a tube 140, a body cover 160, a pump support 180, a shoulder 210, a nozzle 230, a pump 240, and an upper cap 260.

The upper cap 260 has the shape of a hollow column and is open at the bottom. The upper cap 260 is coupled to a periphery of the shoulder 210 to cover the nozzle 230.

Figure 4:
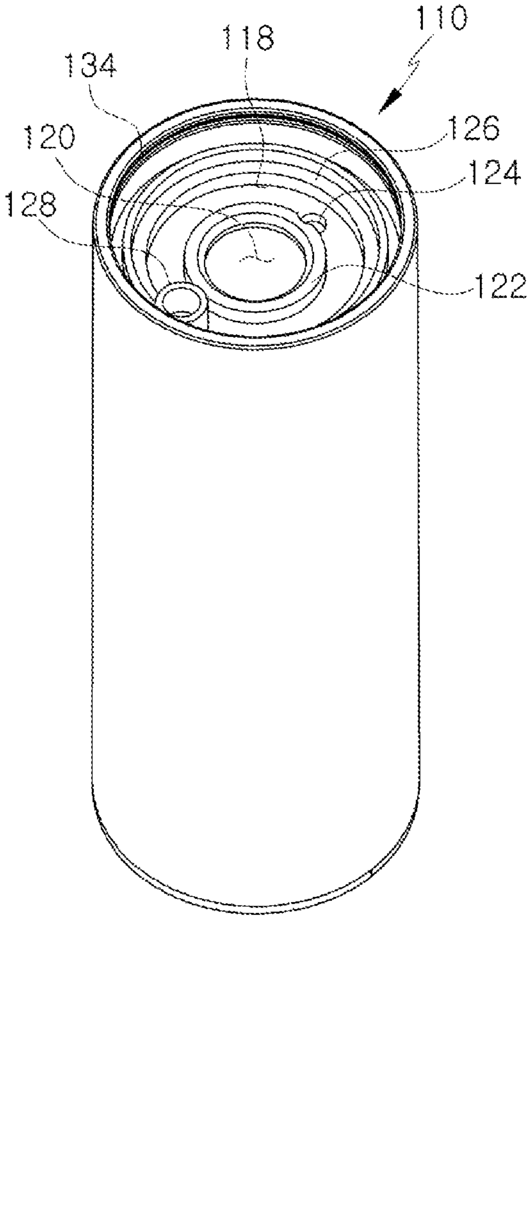
FIG. 4 and FIG. 5 are perspective views of the body of the container illustrated in FIG. 1.
Figure 5:
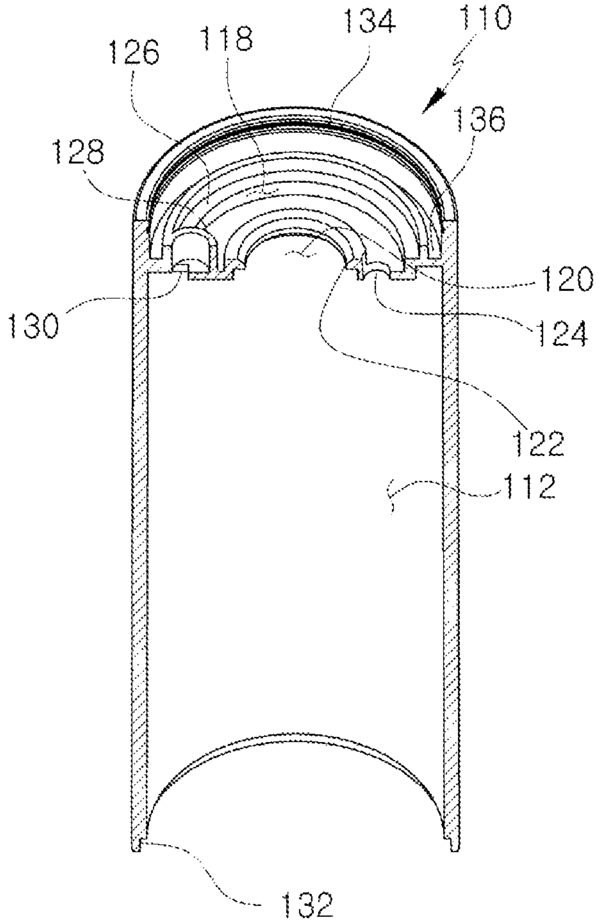

FIG. 4 and FIG. 5 are perspective views of the body 110 of the container 100 illustrated in FIG. 1.

Referring to FIGS. 2 to 5, a filling space 112 for storing the content is formed within the body 110, where the filling space 112 is divided from the body outlet passage 113 by the tube 140. The tube 140 has the shape of a hollow cylinder in the same manner as the body 110 and is inserted within the body 110 such that the outer perimeter of the tube 140 and the inner perimeter of the body 110 form the body outlet passage 113. Thus, the body outlet passage 113 has the horizontal cross section forming an annular shape and has the overall appearance of the perimeter part of a cylinder. The body outlet passage 113 can be formed with a small gap. Also, the body outlet passage 113 can lead to a pump insertion space 164 of the body cover 160 via an upper movement hole 130.

The body outlet passage 113 corresponds to the passage through which the content moves upward. That is, due to the operation of the pump 240, the content is drawn into and moved upward along the body outlet passage 113 and passes through the upper movement hole 130 and cover channel 168 and into the pump insertion space 164. In this way, the body outlet passage 113 is formed along the entire inner perimeter of the body 110 to provide a passage through which the content can move.

While the body 110 of the container 100 based on this embodiment is illustrated as having a generally circular cross section, the present invention is not limited by the cross-sectional shape of the body 110. Thus, another embodiment of the present invention can have the body formed with any of a variety of cross-sectional shapes including polygonal shapes, such as triangles and quadrilaterals, and elliptical shapes, among others. Here, the tube inserted inside the body can have a cross-sectional shape corresponding to that of the body.

At one end of the body 110, there is formed a body coupler part 118 having a concave shape. The body cover 160, the pump support 180, and the shoulder 210 are coupled onto the body coupler part 118.

A body center hole 120 is formed in the center of the body coupler part 118, and a center protrusion 122 is formed around the body center hole 120. The body center hole 120 connects with the filling space 112, and the pump insertion space 164 of the body cover 160 is inserted therein. The center protrusion 122 has a cross section shaped as an inverted "L" and has the pump insertion space 164 inserted therethrough. Also, the inner end portion of the center protrusion 122 can press against the outer perimeter of the pump insertion space 164, thereby preventing any entry of outside air or foreign substances through the body center hole 120.

On one side of the body center hole 120, an air hole 124 is formed that connects with the filling space 112. An air nozzle 146 of the tube 140 is inserted through the air hole 124, allowing outside air to enter the interior of the filling space 112 through the air nozzle 146.

On the other side of the body center hole 120, there is formed an outlet protrusion 128 having the shape of a hollow cylinder, where an upper movement hole 130 that can connect with the filling space 112 is formed in a portion of the bottom surface of the outlet protrusion 128. The content that has entered through the body outlet passage 113 moves through the upper movement hole 130 and outlet protrusion 128 and then moves through the cover channel 168 of the body cover 160 into the pump insertion space 164. A passage protrusion 172 formed on a lower surface of the body cover 160 is inserted within the outlet protrusion 128.

In the body coupler part 118, an upper step 126 is formed around the body center hole 120. Also, around the upper step 126, there is formed a body coupler groove 136. A coupler periphery member 214 of the shoulder 210 is inserted in the body coupler groove 136.

On the inner perimeter of the upper part forming the body coupler part 118, there can be formed a body detent groove 134. A coupler protrusion 216 formed on the outer perimeter of the shoulder 210 can be inserted into the body detent groove 134, so that the shoulder 210 can be firmly coupled to the body 110.

At the other end of the body 110, a lower step 132 is formed. A base 138 is coupled to the lower step 132 to seal off the lower end of the body 110.

Figure 6:
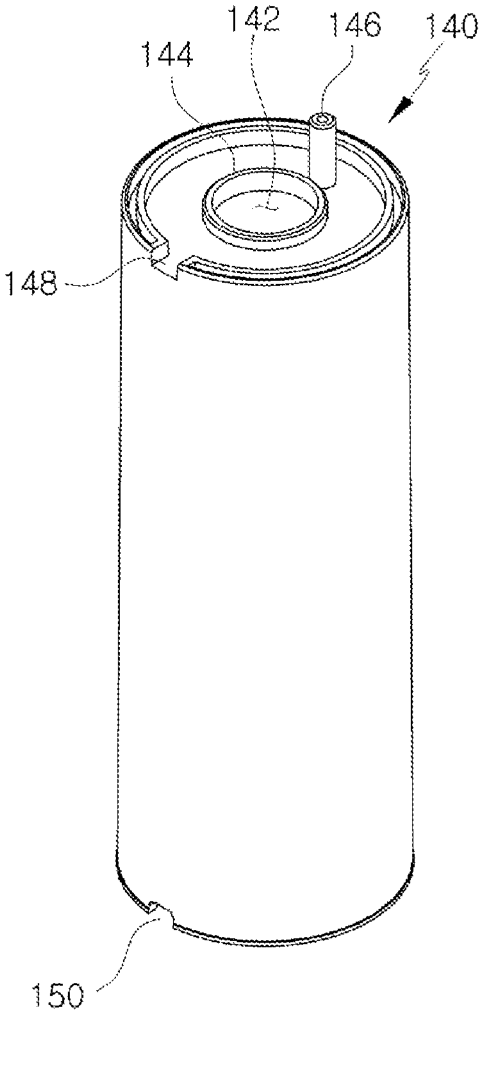
FIG. 6 and FIG. 7 are perspective views of the tube of the container illustrated in FIG. 1.
Figure 7:
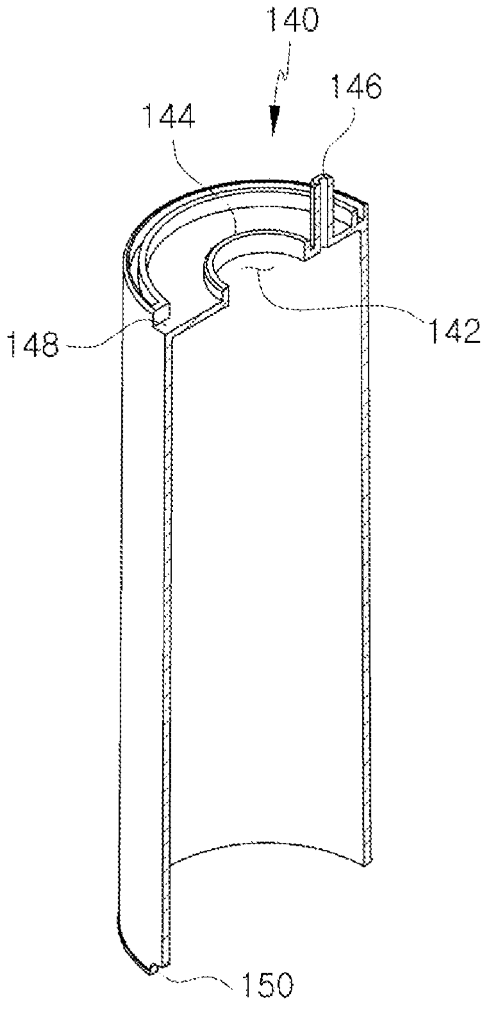

FIG. 6 and FIG. 7 are perspective views of the tube 140 of the container 100 illustrated in FIG. 1.

Referring to FIG. 2, FIG. 3, FIG. 6, and FIG. 7, the tube 140 has the shape of a hollow cylinder corresponding to that of the body 110 and has the filling space 112 formed therein for storing the content. The tube 140 is inserted within the body 110 such that the annularly shaped body outlet passage 113, which corresponds to a passage for the movement of the content, is formed between the outer perimeter of the tube 140 and the inner perimeter of the body 110. The tube 140 is structured to have an open bottom and a partially sealed top in a manner similar to that of the body 110.

In the center of an upper part of the tube 140, a tube center hole 142 is formed. The tube center hole 142 connects with the body center hole 120 of the body 110, and the pump insertion space 164 is inserted therein. Also, around the tube center hole 142, there is formed a center protrusion 144 protruding upward. The center protrusion 144 is inserted within the center protrusion 122 of the body 110.

At an upper part of the tube 140, an air nozzle 146 protrudes from one side of the tube center hole 142. The air nozzle 146 has the shape of a hollow cylinder and has its other end connecting with the inside of the tube 140 (i.e., the filling space 112). The air nozzle 146 is inserted into an air inlet protrusion 177 formed on the body cover 160. The outside air that has entered through the air nozzle 146 is drawn into the filling space 112 to prevent a pressure decrease.

In an upper part of the tube 140, an upper tube hole 148 is formed. The upper tube hole 148 corresponds to an exit for the body outlet passage 113, and the content moves through the upper tube hole 148 and then through the passage protrusion 172 and cover channel 168.

In a lower part of the tube 140, a lower tube hole 150 is formed. The lower tube hole 150 corresponds to an entrance for the body outlet passage 113, and the content moves through the lower tube hole 150 into the body outlet passage 113.

The upper tube hole 148 and the lower tube hole 150 can be positioned along a straight line on the outer perimeter of the tube 140. Also, at least one of the upper tube hole 148 and the lower tube hole 150 can be provided in multiple numbers.

Figure 8:
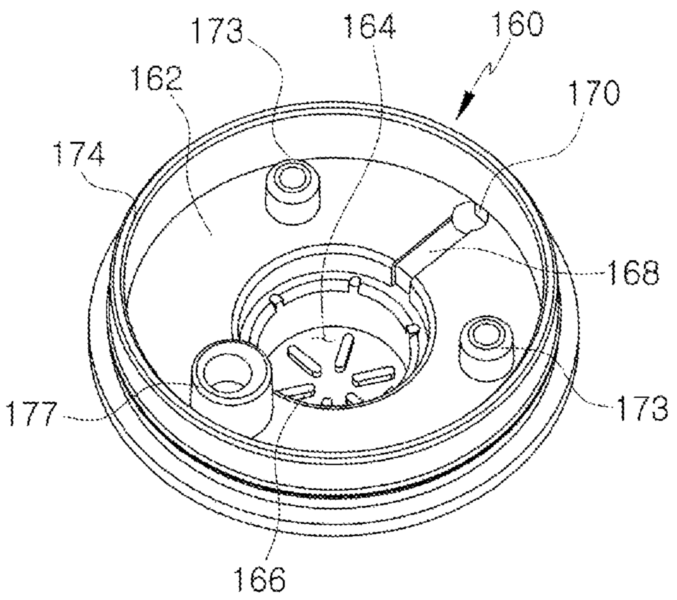
FIG. 8 and FIG. 9 are a perspective view and a perspective cross-sectional view illustrating the body cover.
Figure 9:
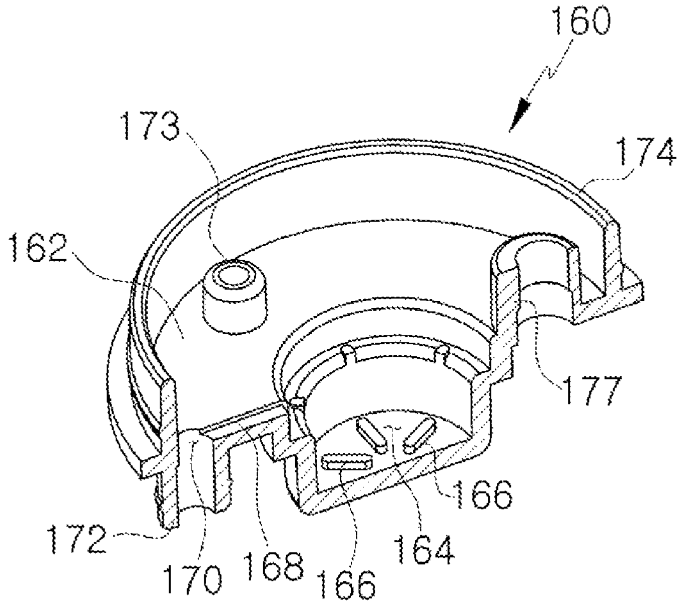

FIG. 8 and FIG. 9 are a perspective view and a perspective cross-sectional view illustrating the body cover 160.

Referring to FIG. 2, FIG. 3, FIG. 8, and FIG. 9, the body cover 160 is coupled to an upper part of the body 110 and has the pump support 180 and the shoulder 210 coupled sequentially to an upper part thereof. The body cover 160 includes a cover plane 162 and an upper periphery member 174, which protrudes upward from a face of the cover plane 162 and has an annular shape with an open top. The pump insertion space 164, the cover channel 168, securing protrusions 173, and the air inlet protrusion 177 are provided on the inside of the upper periphery member 174. The passage protrusion 172 protrudes downward from the lower surface of the cover plane 162.

The pump insertion space 164 is a cavity formed concavely in the center of the cover plane 162 and has a circular horizontal cross section. A housing 246 of the pump 240 is inserted within the pump insertion space 164. A lower inlet hole 247 is formed in a lower surface of the housing 246, and the content that has been drawn into the pump insertion space 164 is drawn through the lower inlet hole 247 into the inside of the housing 246.

The pump insertion space 164 protrudes downward from the cover plane 162, and this part is inserted into the body center hole 120 of the body 110 and the tube center hole 142 of the tube 140.

One side of the upper part of the pump insertion space 164 connects with the cover channel 168. Thus, the content that has entered through the cover channel 168 moves downward to the bottom of the pump insertion space 164 and is drawn into the housing 246.

On the bottom surface of the pump insertion space 164, a multiple number of separation protrusions 166 can be disposed in a circular arrangement. The separation protrusions 166 can have a particular length, and multiple separation protrusions 166 can be disposed with a particular gap in-between. The housing 246 of the pump 240 touches the separation protrusions 166 and is separated from the bottom surface of the pump insertion space 164 by a corresponding height. Thus, the content that has entered the pump insertion space 164 can be drawn into the housing 246 through the gaps formed in-between the separation protrusions 166.

The cover channel 168, having a particular width and depth, is formed in a straight line in the cover plane 162. The cover channel 168 can have a cross section of a quadrilateral shape and can have one end connected with a cover inlet hole 170 and the other end connected with the pump insertion space 164. The cover channel 168 is defined by a bottom surface and two side surfaces, and its open top is closed off by the pump support 180.

The cover inlet hole 170 formed at one end of the cover channel 168 is formed penetrating through the cover plane 162 and connects with the internal space of the passage protrusion 172.

The passage protrusion 172 protrudes from the lower surface of the cover plane 162 and is structured in the shape of a hollow cylinder with its lower end open. The passage protrusion 172 has its upper end closed off by the pump support 180 so as to connect to the cover channel 168 through the cover inlet hole 170 only. The passage protrusion 172 is inserted into the outlet protrusion 128 formed on the upper part of the body 110.

On the cover plane 162, there are two securing protrusions 173 formed, which, together with the air inlet protrusion 177, can be disposed in an arrangement shaped as a regular triangle. The securing protrusions 173 are inserted respectively into two second insertion cavities 198 formed in the lower part of the pump support 180, whereby the pump support 180 is coupled to the upper part of the body cover 160.

An inner periphery member 184 and an outer periphery member 182 of the pump support 180 are positioned at the inner perimeter and outer perimeter, respectively, of the upper periphery member 174. Thus, the upper periphery member 174 is inserted into a coupler groove 186 formed between the inner periphery member 184 and outer periphery member 182.

On the inside of the upper periphery member 174, there is formed an air inlet protrusion 177 having the shape of a hollow cylinder. The upper end and lower end of the air inlet protrusion 177 are both open, and the air nozzle 146 of the tube 140 is inserted therein. Air can be drawn into the filling space 112 of the body 110 through the open upper end of the air nozzle 146.

Figure 10:
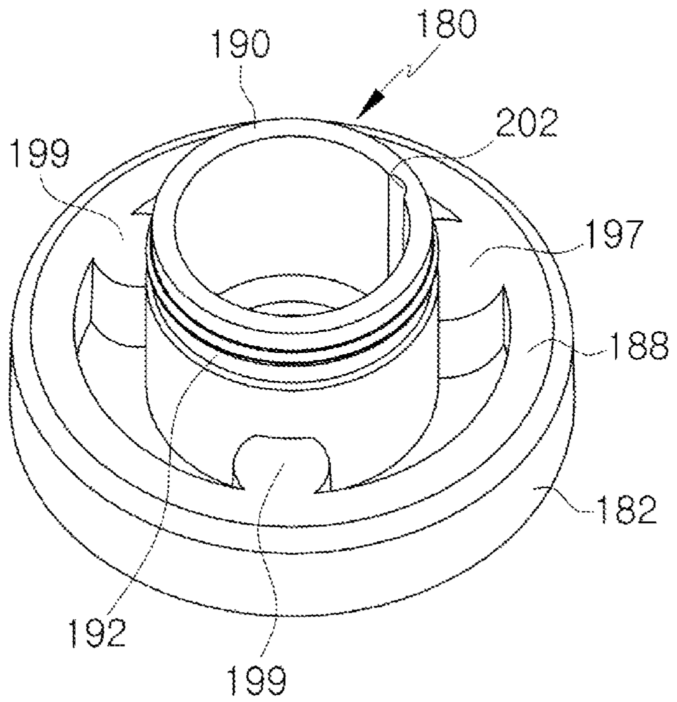
FIG. 10 and FIG. 11 are a perspective view and a perspective cross-sectional view illustrating the pump support.
Figure 11:
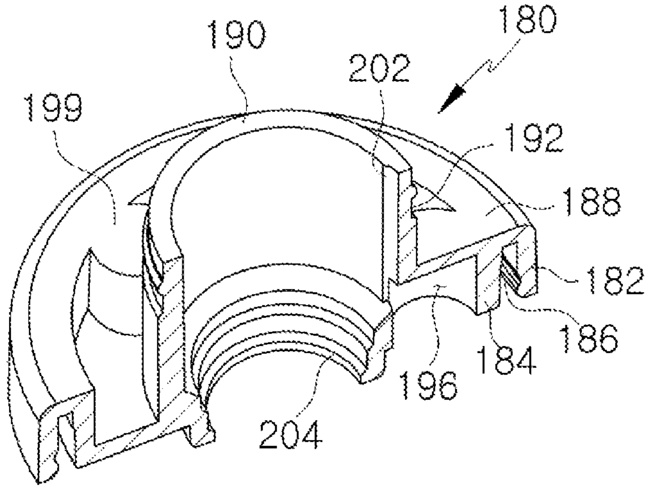

FIG. 10 and FIG. 11 are a perspective view and a perspective cross-sectional view illustrating the pump support 180.

Referring to FIG. 2, FIG. 3, FIG. 10, and FIG. 11, the pump support 180 is coupled to an upper part of the body cover 160 to support the pump 240 in a stable manner while preventing the entry of outside air into the pump insertion space 164. The pump support 180 includes at its center the support body 190, which has the shape of a hollow cylinder, and includes the outer periphery member 182 and inner periphery member 184 formed around the support body 190.

The outer periphery member 182 and inner periphery member 184 have annularly shaped cross sections, and the coupler groove 186 corresponding to a gap is formed therebetween. The upper periphery member 174 of the body cover 160 is inserted into the coupler groove 186 by way of press fitting. A placement step 188 is formed on an upper part of the outer periphery member 182, where an upper surface of the placement step 188 is pressed downward by a pressing protrusion 218 provided on the inside of the shoulder 210.

The support body 190 is positioned on the inside of the inner periphery member 184 and has a height greater than that of the inner periphery member 184. A body detent groove 192 is formed in the outer perimeter of the support body 190, and inner coupler protrusions 222 formed on the inside of the shoulder 210 are inserted into the body detent groove 192. Such a body detent groove 192 and inner coupler protrusions 222 allow the shoulder 210 to be coupled to the pump support 180 in a stable manner.

The housing 246 of the pump 240 is inserted into the empty space within the support body 190. A contact protrusion 204 having an annular shape is formed on the inner perimeter of a lower part of the support body 190. The contact protrusion 204 presses against and tightly contacts the outer perimeter of the housing 246 of the pump 240, whereby outside air is prevented from entering the inside of the pump insertion space 164.

In the inner perimeter of the support body 190, there is formed a support air groove 202, which extends from the upper end by a particular length. A particular gap is formed between the support air groove 202 and the housing 246 of the pump 240, and air enters through this gap to the upper end of the air nozzle 146 of the tube 140.

An empty space is formed between the inner periphery member 184 and the support body 190, and in this empty space, there are formed a first insertion cavity 196 and two second insertion cavities 198 that include their respective upper surfaces 197, 199. The first insertion cavity 196 and second insertion cavities 198 correspond to empty spaces that are closed off at the top by the upper surfaces 197, 199 and open at the bottom.

An air inlet protrusion 177 formed on the body cover 160 is inserted into the first insertion cavity 196. Since the upper end of the air inlet protrusion 177 does not touch the upper surface 197, a passage is formed therebetween through which air can move. Also, the securing protrusions 173 are inserted into the second insertion cavities 198, allowing the pump support 180 to be coupled to the upper part of the body cover 160 in a stable manner.

Figure 12:
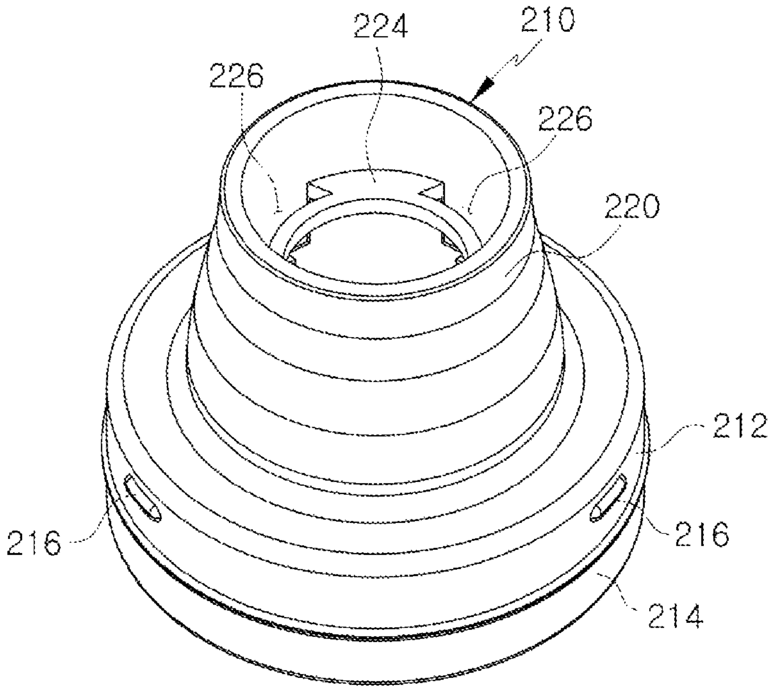
FIG. 12 and FIG. 13 are a perspective view and a perspective cross-sectional view illustrating the shoulder.
Figure 13:
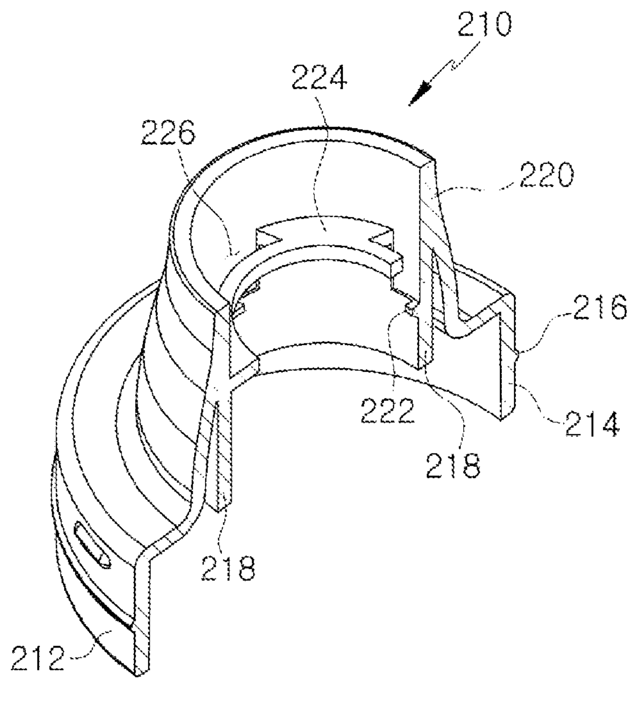

FIG. 12 and FIG. 13 are a perspective view and a perspective cross-sectional view illustrating the shoulder 210.

Referring to FIG. 2, FIG. 3, FIG. 12, and FIG. 13, the shoulder 210 couples to the upper part of the pump support 180 to press down on the pump 240 and has the nozzle 230 coupled to an upper part thereof. The shoulder 210 includes a hollow pump coupler part 220 and a shoulder coupler part 212 that is formed around the pump coupler part 220 and is open at the bottom only.

The shoulder coupler part 212 includes a coupler periphery member 214, which is inserted into the body coupler part 118 as already described above. Since the bottom of the shoulder coupler part 212 is open, the body cover 160 and the pump support 180 are housed therein.

The shoulder coupler part 212 includes an upper surface (no number assigned), and the pump coupler part 220 is formed in a protruding manner in the center of the upper surface. Also, a coupler protrusion 216 can be formed on the periphery of the shoulder coupler part 212. The coupler protrusion 216 is inserted into the body detent groove 134 formed in the inner perimeter of the body coupler part 118.

On the inside of the pump coupler part 220, the pressing protrusion 218 having the shape of a hollow cylinder is formed. The pressing protrusion 218 presses down on the placement step 188 of the pump support 180, whereby the pump support 180 and the pump 240 are coupled to the body 110 in a stable manner.

The pump coupler part 220 is structured in the shape of a hollow conical frustum with both the upper end and lower end open. The pump 240 and the support body 190 are inserted within the pump coupler part 220. The lower end of the pump coupler part 220 connects with the interior space of the shoulder coupler part 212.

On the inside of the pump coupler part 220, an annularly shaped detent protrusion 224 is formed protruding inwardly. The detent protrusion 224 is partially cut away to form shoulder air holes 226. The detent protrusion 224 presses down on a flange 245 formed around the housing 246 of the pump 240, whereby the pump 240 is secured to the pump insertion space 164 in a stable manner. Referring to FIG. 2, the flange 245 does not touch the upper end of the support body 190 of the pump support 180 and is separated by a particular gap. Due to this gap, air from outside the container 100 can move through the shoulder air holes 226, the air inlet protrusion 177, and the air nozzle 146 to enter the inside of the filling space 112.

The shoulder air holes 226 correspond to arc shaped holes formed as portions of the detent protrusion 224 are cut away.

The inner coupler protrusions 222 are formed protruding from below the shoulder air holes 226.

A multiple number of inner coupler protrusions 222 are formed in particular intervals on the inner perimeter of the pump coupler part 220. The inner coupler protrusions 222 are inserted in the body detent groove 192 formed in the outer perimeter of the support body 190.

Figure 14:
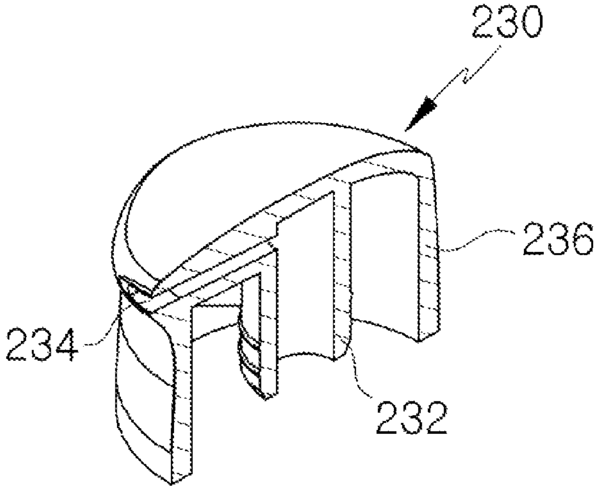
FIG. 14 is a perspective cross-sectional view illustrating the nozzle.
Figure 15:
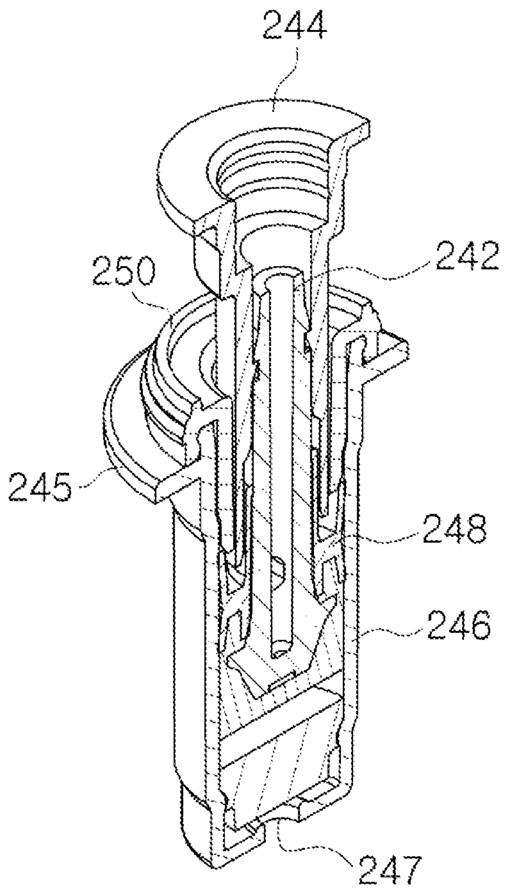
FIG. 15 is a perspective cross-sectional view illustrating the pump.

FIG. 14 is a perspective cross-sectional view illustrating the nozzle 230, and FIG. 15 is a perspective cross-sectional view illustrating the pump 240.

Referring to FIG. 14 and FIG. 15, the nozzle 230 includes a nozzle protrusion 232 that couples with a valve 244 of the pump 240, and the nozzle protrusion 232 connects with a discharge exit 234. The valve 244 includes a nozzle periphery member 236, which is partially inserted within the pump coupler part 220 of the shoulder 210. The valve 244 is elastically supported by a spring (not shown), so that when an external force applied on the nozzle 230 is removed, the valve 244 is raised by the elastic restoring force of the spring. The nozzle 230 is covered by the upper cap 260.

The pump 240 has its lower part inserted in the pump insertion space 164 formed in the body cover 160 and is secured in position as the housing 246 is pressed downward by the detent protrusion 224 of the shoulder 210. The pump 240 draws the content into the inside of the pump insertion space 164 and applies suction that allows the content to be discharged through the nozzle 230.

The pump 240 includes a housing 246, a valve 244, a housing cover 250, a piston 248, and a guide 242, which form a structure that is identical or similar to the pump structure disclosed in Korean Registered Patent No. 1963619 and thus are not described here in further detail.

Referring to FIG. 3, the suctioning force of the pump 240 causes the content in the filling space 112 to enter the body outlet passage 113 through the lower tube hole 150 formed in the lower part of the tube 140, move up, and pass through the upper movement hole 130 to be discharged out of the body outlet passage 113. After the content is discharged through the upper movement hole 130, the content enters the passage protrusion 172 and then passes through the cover inlet hole 170 and cover channel 168 to enter the inside of the pump insertion space 164. Also, the content is moved from the pump insertion space 164 to the inside of the housing 246 by the suctioning force of the pump 240 and discharged through the nozzle 230 to the exterior of the container 100.

Thus, since the container 100 according to this embodiment does not include a hose for suctioning the content inside the body 110, the embodiment can provide a simplified structure and can resolve the problem of the hose hurting the aesthetic of the container.

As the content is drawn out by the pump 240 from the inside of the filling space 112, the pressure within the filling space 112 can be lowered. As such pressure decrease within the filling space 112 may cause a decrease in the suctioning force of the pump 240, it is necessary to maintain the pressure within the filling space 112 at a particular value (for example, atmospheric pressure).

With the container 100 according to this embodiment, outside air is drawn into the pump coupler part 220 through the gap (no number assigned) formed between the nozzle 230 and the inner perimeter of the pump coupler part 220. The air that has entered the pump coupler part 220 moves through the shoulder air holes 226, the support air groove 202, and the air nozzle 146 to enter the inside of the filling space 112. As the outside air thus enters the inside of the filling space 112 and maintains atmospheric pressure, the suctioning force of the pump 240 can be maintained at a particular level.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A container for spraying liquid, the container comprising:
- a tube having a filling space;
- a body in which the tube is inserted, an outer perimeter of the tube and an inner perimeter of the body forming a body outlet passage, the tube having a lower tube hole formed in a lower part of the tube as an entrance to the body outlet passage, the body having an upper movement hole formed in an upper part of the body as an exit from the body outlet passage;
- a body cover coupled to the upper part of the body, the body cover comprising a cover channel and a pump insertion space, the cover channel being connected with the upper movement hole, the pump insertion space being connected with the cover channel;
- a pump inserted in the pump insertion space for dispensing a content;
- a pump support coupled to an upper part of the body cover and supporting the pump, the pump support blocking an entry of outside air into the pump insertion space; and
- a shoulder coupled to an upper part of the pump support and pressing down on the pump,
- wherein the shoulder comprises a detent protrusion pressing down on the pump,
- the detent protrusion has a shoulder air hole,
- the pump support has a support air groove connected with the shoulder air hole,
- the body has an air nozzle connected with the support air groove, and
- the air nozzle is connected with the filling space.

2. The container for spraying liquid according to claim 1, wherein a separation protrusion is formed on a bottom surface of the pump insertion space such that a gap is formed between the pump and the bottom surface.

3. The container for spraying liquid according to claim 1, wherein a center hole is formed in the upper part of the body, the pump insertion space is inserted in the center hole, an outlet protrusion is formed on one side of the center hole, and the upper movement hole is formed in an inside of the outlet protrusion.

4. The container for spraying liquid according to claim 3, wherein the body cover comprises a passage protrusion, the passage protrusion being inserted in the inside of the outlet protrusion and connected with cover channel.

5. The container for spraying liquid according to claim 1, wherein the pump support comprises a contact protrusion tightly contacting a periphery of the pump.

6. The container for spraying liquid according to claim 1, wherein the body has a horizontal cross section shaped as any one of a triangle, a quadrilateral, a circle, and an ellipse.

7. The container for spraying liquid according to claim 1, wherein the body cover comprises an air inlet protrusion in which the air nozzle is inserted therein.

8. The container for spraying liquid according to claim 1, wherein a base is coupled to a lower part of the body.

* * * * *